United States Patent [19]

Vaarala

[11] Patent Number: 5,602,378
[45] Date of Patent: Feb. 11, 1997

[54] DETECTION BY A SCANNER OF RADIATION FROM THE SCANNER REFLECTED FROM A BAR CODE

[76] Inventor: Harri O. Vaarala, Peuratie 6, FIN 96440 Rovaniemi, Finland

[21] Appl. No.: 492,056

[22] PCT Filed: Mar. 24, 1995

[86] PCT No.: PCT/FI95/00158

§ 371 Date: Jul. 20, 1995

§ 102(e) Date: Jul. 20, 1995

[87] PCT Pub. No.: WO95/26537

PCT Pub. Date: Oct. 5, 1995

[30] Foreign Application Priority Data

Mar. 25, 1994 [FI] Finland ..................... 941386

[51] Int. Cl.⁶ ..................... G06K 7/10
[52] U.S. Cl. ............... 235/462; 235/440; 235/448; 235/454; 250/566
[58] Field of Search ............. 235/462, 440, 235/448, 454; 250/234, 235, 236, 566

[56] References Cited

U.S. PATENT DOCUMENTS

| | | |
|---|---|---|
| 1,985,035 | 12/1934 | Kermode et al. |
| 3,735,094 | 5/1973 | Dunn ............... 235/440 |
| 3,939,327 | 2/1976 | Humphrey ............ 235/454 |
| 3,947,691 | 3/1976 | Goldstein ............ 250/566 |
| 4,020,327 | 4/1977 | Geary et al. ........ 235/454 |
| 4,101,072 | 7/1978 | Weaver et al. ...... 235/455 |
| 4,983,817 | 1/1991 | Dolash et al. ...... 235/455 X |
| 5,118,369 | 6/1992 | Shamir .............. 235/462 X |

FOREIGN PATENT DOCUMENTS

| | | |
|---|---|---|
| 553046A1 | 7/1993 | European Pat. Off. |
| 1814536 | 6/1970 | Germany . |
| 1111468 | 4/1968 | United Kingdom . |
| 1359254 | 7/1974 | United Kingdom . |
| 1470562 | 4/1977 | United Kingdom . |

*Primary Examiner*—Donald T. Hajec
*Assistant Examiner*—Michael G. Lee
*Attorney, Agent, or Firm*—Browdy and Neimark

[57] ABSTRACT

The invention relates to a method for the detection of imprint markings (6) made into an object, especially for reading a bar code, the markings (6, 6a) of which are formed into a second level (8) which differs from the surface level (4) of the object, the second level (8) being arranged to reflect a radiation (5) to at least some extent. The method utilizes apparatus which transmit (1) and receive (2) a radiation, the apparatus being separated from each other by a separating wall (3) which is arranged transversely with respect to the surface plane of the object and near the surface (4), the wall preventing radiation from passing from the transmitting (1) to the receiving apparatus (2) at such locations where the surface (4), which is at a higher lever, extends to an edge (7) of the separating wall (3). The invention also relates to a reader head device for reading imprint markings (6) made into the surface of an object, wherein an edge (7) of a separating wall (3) extends beyond the transmitting and/or receiving apparatus (1, 2) essentially to the higher located surface (4) of the object. The invention further relates to the use of the method and device for reading a bar code.

11 Claims, 4 Drawing Sheets

DETECTION BY A SCANNER OF RADIATION FROM THE SCANNER REFLECTED FROM A BAR CODE

BACKGROUND OF THE INVENTION

1. Field of the Invention

The present invention relates to a method wherein a bar code imprinted into a product is read using a reader device in order to transfer forward a signal formed by said code. The invention also relates to a reader device wherein the inventive method is used. The invention further relates to the use of said reader device and said method.

2. Prior Art

At present bar codes are made onto products using, for instance, printing ink, in which case the reading of the bar code is based on a method wherein reflective differences are detected. In a bar code reader pen there is a light source and a receiver which detects the dark and light areas of the bar code as the reader pen is transported over said bar code. An analog signal is formed, which is transformed into a digital signal for the actual reader device. In a scanner type reader there is one or several light sources and one or several receivers which read the bar code when the reader device is kept in position over said bar code.

The barcode bars are distinguished from each other based on the fact that dark and light areas reflect light differently. Thus, a correct reading of a code usually requires that the reflection from light areas is at least four times stronger than the reflection from dark areas, or, contrarily, the reflections from dark areas must, correspondingly, not exceed 25% of the reflections from light areas.

On the other hand, a method (see Finnish patent No 85956) has been developed for making a bar code in the surface of a product, wherein a sticker comprising a stamp means in accordance with the bar code is placed on the surface of the product. When the sticker is pressed against the product, the bar code on the sticker will form a depressed permanent bar code into the Surface of the product. In this code the original reflection both from the background and from a bar is essentially equal, and this bar code cannot be read with usual bar code readers before the depressed portions have been painted for example black.

Arrangements are prior known for reading especially the embossed writing used in connection with credit cards or the like. Thus, GB patent publication No. 1 470 562 discloses an identifying arrangement wherein the portions rising above the base plane of a surface are identified in such a manner that light from a lamp is brought to pass through a plate comprising two slots. Said plate is parallel to the surface of the object and is located at a distance therefrom. The distance between said slots is arranged such that a light beam passing inclined through the first of said slots will meet a lower surface, and will be reflected at a corresponding inclination via the second one of said slots out to a receiver. On the other hand, if the light beam meets a surface located higher up, the lateral displacement of the beam will be so short that the light beam will not meet the second slot and thus it cannot reach the receiver. In such an arrangement the internal relative measures in the apparatus are extremely critical and only embossments fulfilling certain criteria can, at each arrangement, reflect the light in such a manner that the desired detection is obtained.

U.S. Pat. No. 3,947,691 also describes a reader device for embossed printing in credit cards, said device comprising light emitting first optical fiber means and receiving second optical fiber means located at a distance therefrom. In the device according to said patent an optical fiber is arranged perpendicularly against the marked surface of a body, for illuminating a portion of said surface. Correspondingly, receiving means are located perpendicularly against said surface. The construction is technically rather complicated and its precision is widely depending on how small the optical fiber arrangement is built, and with the use of said apparatus it is mainly possible to exactly observe only markings located in a distinct area, the width of each marking further being of a certain dimension. Thus, the use of said known arrangement for the general reading of bar codes is difficult i.a. because it is normally impossible to position the bar code reader exactly.

GB patent publication No. 1 359 254 also discloses an optical card reader wherein the end of a light bringing optical fiber and, correspondingly, the end of a light determining optical fiber are arranged into the immediate vicinity, or in practice, into contact with the surface of said card. Said optical fibers are located at a certain mutual angle. In this application too a complicated optical fiber optics is utilized. In U.S. Pat. No. 4,020,327 there is, on the other hand, a general comment regarding the general inapplicability of optical fiber optics, and an optical arrangement is disclosed instead which comprises several light sources and one receiver, wherein the apparatus is based on a rather complicated optical arrangement for focusing several light beams onto certain areas of the object to be read, and further for focusing reflected beams from these areas to a common receiving point. The solution disclosed in this document is also technically complicated and demands great exactness of the optical arrangements and on the mutual dimensional relations between the components related thereto.

OBJECT AND SUMMARY OF THE INVENTION

The purpose of the present invention is to develop a simple method and apparatus which technically can be realized within a wide dimensional range and wherein a bar code imprinted in the surface of an object primarily does not need to be separately painted for the reading procedure but where the reading can be executed directly on such a bar code which is constituted of sequentially arranged markings of essentially identical color, the altitude of which, however, differs from the surface level of the object. As such, the invention also is adapted for reading markings wherein the marking to be read rises above the background surface level of the object.

Thus, with the method according to the present invention a bar code is read in such a way that the depressed portions of said bar code will allow a signal generated by a transmitter to pass to a receiver, and a non-depressed portion will not allow the sent signal to reach said receiver. With the method according to the invention an imprinted permanent bar code can be read with the reader device without the need for painting said code in order to achieve a difference in reflectivity.

The characteristics of the invention will be more evident from the appended claims. Thus, the inventive method is characterized in that the readability of a bar code is achieved by the separation of a transmitter and a receiver in such a manner that the depressed portions of said bar code will allow a signal to pass through and the other portions will prevent said signal from passing through. More exactly, said method is characterized in that means for sending and receiving light are separated from each other by a separating wall arranged essentially transversely with respect to the surface plane of the object, said wall having an edge extending from the surface level of said sending and/or receiving means arranged close to the surface of said object, whereby said separating wall, at such locations where a surface positioned at a higher level extends up to said separating wall, prevents a light from passing from said sending means to said receiving means. Said expression "higher" is especially intended to mean that an edge portion of said wall is brought, at the location of such a portion of the plane of the object the level of which is higher up or closer to said sending and/or receiving means, to extend beyond said sending and/or receiving means towards said plane level and to prevent at least an essential portion of the light emanating from said sending means and reflected from the surface of said object and/or said marking from passing between said plane and the edge of said separating wall to said receiving means.

The inventive apparatus, on the other hand, is characterized by having the reading apparatus designed in accordance with the principles disclosed above and further utilizing e.g. mirror surfaces for focusing the signal sent and received. The inventive apparatus is especially characterized in that means arranged between said sending and said receiving means comprise a separating wall which is arranged in a substantially transverse plane with respect to the surface plane of said object, the edge of said wall extending beyond said sending and/or receiving means essentially to the surface of said object.

As One of the most important advantages of the invention, the fact may be mentioned the fact that the reading of a permanent bar code can be performed without a need for separate measures to be taken for achieving a distinction of the reflection for the reading of the imprinted bar code. The invention may be utilized e.g. in the metal and plastics industry when a permanent bar code is marked on the surface of a product.

Technically, the inventive apparatus can be realized in several different ways, all having in common that there are no critical requirements regarding the quality and the disposition of said sending and receiving means. Thus, the arrangement can be set up utilizing many different kinds of transmitter-receiver combinations where the transmitter and/ or the receiver, respectively, may even be of a quite large size, since the distance from said means to the surface to be detected is no really crucial factor.

BRIEF DESCRIPTION OF THE DRAWINGS

One embodiment of the invention will now be more closely discussed with reference to the appending drawing, wherein.

DETAILED DESCRIPTION OF THE PREFERRED EMBODIMENT(S) OF THE INVENTION

Figure 1:
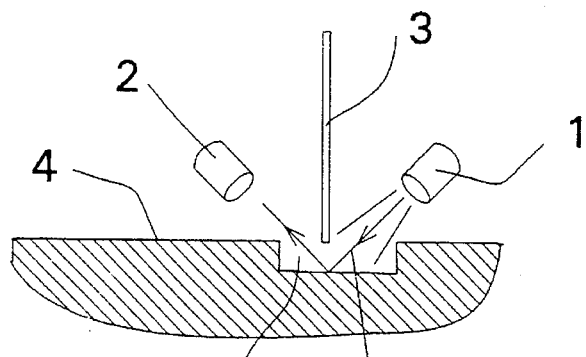
FIGS. 1 and 2 show the principle used for bar code reading, seen in a section A—A of to FIG. 3.

In order to read a bar code 6 depressed in the surface of a product 4, a barrier for the free passage of radiation 5, i. e, a separating wall 3, is arranged in accordance with FIG. 1 between a transmitter 1 and a receiver 2 in such a manner that when the reader device is moved over said bar code 6, radiation 5, i.e. a signal from said transmitter 1 can pass to said receiver 2 at the location of a depressed portion of said bar code. In this situation, for instance a light beam emanating from said transmitter 1 meets an at least slightly reflecting Surface 4 of said object, or, in the case according to FIG. 1, the bottom 8 of the depressed portion of said bar code, from which said beam will be reflected back more or less diffused and at an angle which generally corresponds to the angle of incidence. Thus, a portion of said light will hit the receiver 2, from the signal of which an output signal of the reader apparatus is formed using means not shown.

Figure 2:
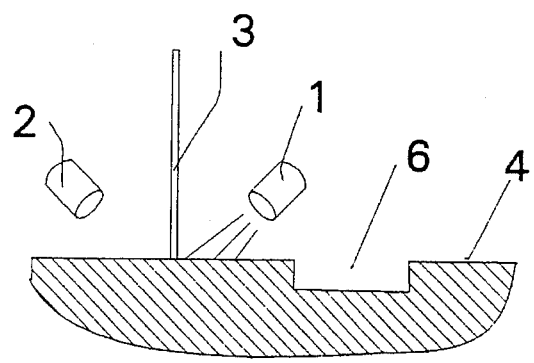

FIG. 2 shows how said separating wall 3 extends essentially down to the surface level 4 of said object. Thus, when said wall 3 is situated outside the imprint constituting to said bar code, said wall is essentially in contact with or only slightly spaced apart from said surface 4. In this situation the passage of said signal 5 sent from said transmitter 1 to said receiver 2 is restricted by said separating wall 3 to such an extent that, in comparison with the situation according to FIG. 1, the difference required for the reading is provided. As is evident from the Figure it is sufficient that said transmitter 1 and said receiver 2 are located on separate sides of said wall, in which case the distance of the transmitter 1 and the receiver from said surface 4 of the object is essentially insignificant with respect to the functional principle of the invention. Correspondingly, it is nearly indifferent at which angle said transmitter and receiver means are arranged with respect to the surface of the object, provided that an amount of radiation considered to be sufficient can pass between them in the situation where a passage channel 9 is constituted between the lower edge 7 of said separating wall 3 and the lowermost bottom plane level 8 of said bar code 6. In comparison with known technology this provides essentially larger possibilities for choosing, in each situation, the transmitter/receiver arrangements suitable for the case.

Figure 3:
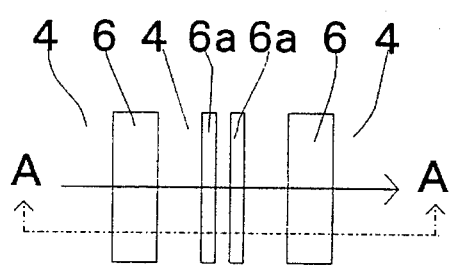
FIG. 3 shows a depressed bar code seen from above.

The invention can simply be defined as using a transmitter 1 and a receiver 2 and a plane 3 located between said transmitter and said receiver for reading depressed portions 6 and non-depressed portions 4 of a bar code, which are permanent or pressed to a lower level 8 with respect to the surface 4 of an object, in such a manner that a signal 5 sent by said transmitter 1 will pass, at said depressed portion 6 of said bar code, to said receiver 2, while said signal 5 sent by said transmitter 1 is blocked by said plane 3 at said non-depressed portion 4 of said bar code, to such an extent that, in situations according to FIG. 1 and FIG. 2, a difference of sufficient magnitude will result in the received signals, when the reader device 1, 2 and 3 is moved over the bar code in accordance with FIG. 3.

Figure 8:
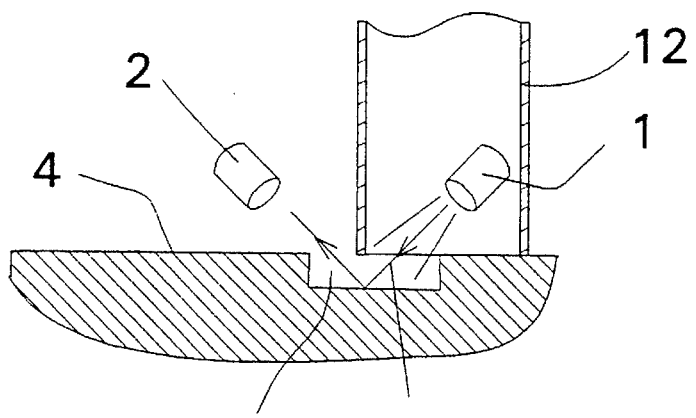
FIGS. 8 and 9 show the principle used for bar code reading using a tubular member.
Figure 9:
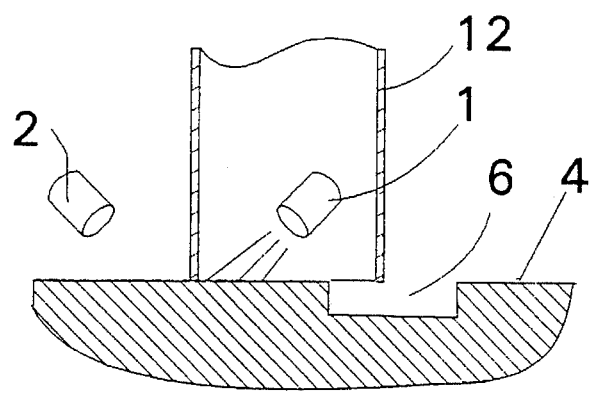

Thus, in the arrangement according to the invention the diffused light reflected from the surfaces is, in a way, utilized and, thus, the nature and location of said transmitter 1 and/or said receiver 2 can be rather freely chosen. Thus, even such an arrangement is possible as shown in FIGS. 8 and 9, wherein either said receiver 2 or said transmitter 1 can be located in a tube 12 extending perpendicularly against said surface 4 of said object, in which case the other part 1, 2, respectively, is located e.g. in a multiple arrangement around said tube. Such a sending and/or receiving means may comprise light diodes, optical fibers, lamps and possibly also means for guiding the radiation, such as holes, slits and/or mirrors, micro wave means or the like, their realization as such having no significance with respect to the arrangement according to the invention. Since said separating wall 3 extends into a close vicinity of the highest surface 4 of said object and thus forms a shadow between said transmitter 1 and said receiver 2, the latter means may also be located at a greater distance from the surface of said object, which considerably widens the assortment of means which can be used.

Figure 4:
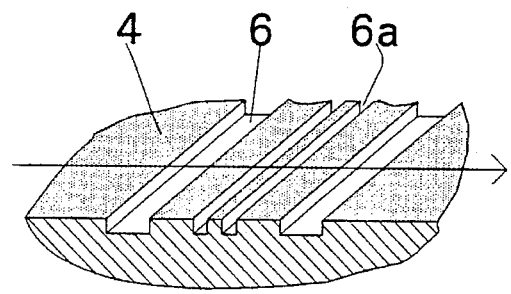
FIG. 4 shows a section of the bar code according to FIG. 3.

FIG. 3 generally shows a bar code which is constituted of successive indentations 6 pressed in the surface 4 of said object, and FIG. 4 Shows in perspective the arrangement according to FIG. 3. Even though the embodiments disclosed in FIGS. 1 to 4 suggest said bar code to be constituted by indentations 6 pressed into the surface of the object, the inventive arrangement can also be applied to cases, wherein the code to be read is higher than the surface of the object, e.g. pressed into a sheet-like object from behind so that said code projects outwards from said surface. In the embodiment according to FIGS. 3 and 4 the reader device is further arranged to be movable at a constant speed in the direction indicated by the arrow, in which case one reading head gives subsequent outgoing signals at such locations, where said surface lies deeper than the edge 7 of said separating wall 3. In this case said edge 7 of said separating wall 3 will be located, at subsequent phases, essentially in the direction of the grooves which constitute said bar code, which is also evident from FIG. 7c.

Figure 5:
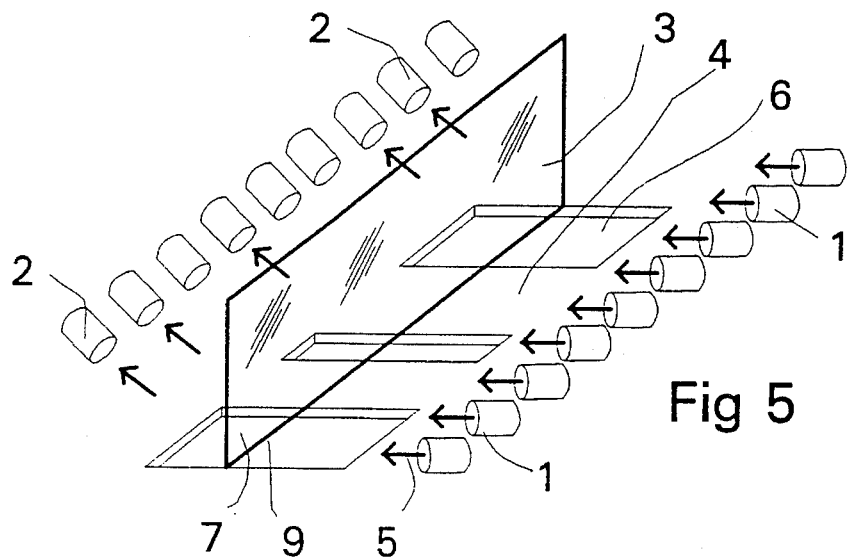
FIG. 5 shows the principle of a reader apparatus when said apparatus is stationary ( for clarity reasons the separating wall is shown, differing from the real case, to be transparent )
Figure 7A:
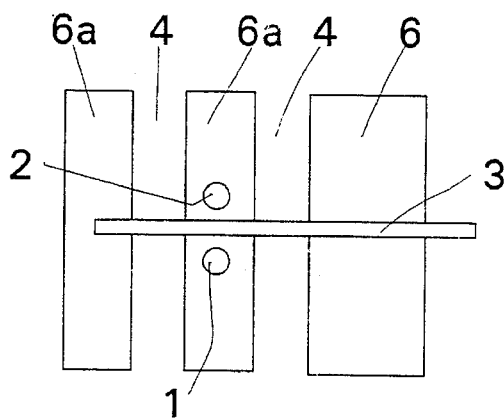
Figure 7B:
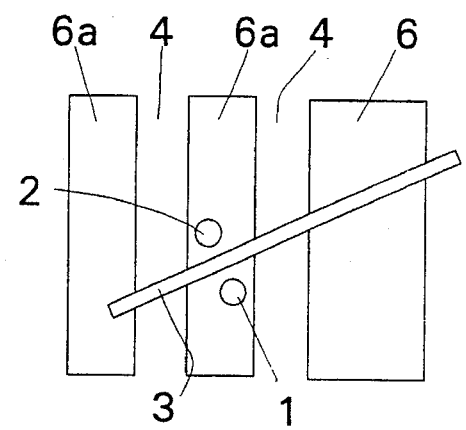
Figure 7C:
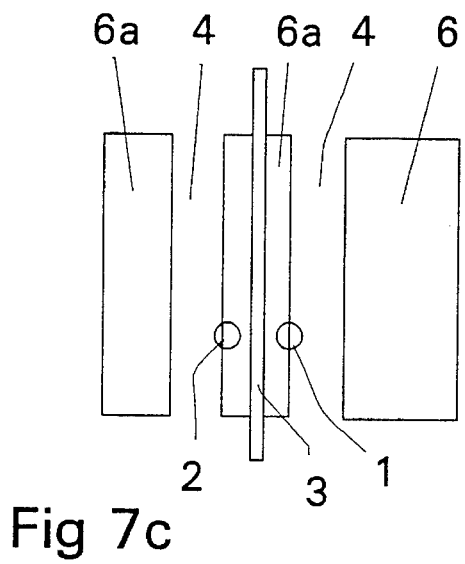

In. FIG. 5 a separating wall 3 is arranged over the bar code 6, said wall 3 separating, at a non-depressed portion of the bar code, the signal 5 sent by one or several transmitters 1 from passing to one or several receivers 2. In this embodiment the bar code can be read in one operation without moving the reader head, as such, over the code. The pure functional principle corresponding to this embodiment is shown in FIG. 7a. FIG. 7b, on the other hand, shows how the reading direction, as such, is rather unimportant with respect to the invention, and the invention functions equally well even in case the reading direction for some reason is at an angle with respect to the extent of the string of markings. Thus, the position of the reader apparatus may be fairly arbitrary.

The inclination of the reader device can also be chosen rather arbitrarily, provided that said edge 7 of said separating wall 3 will be located sufficiently close to the plane level 4, from which an outgoing signal should not be obtained. Thus, said edge 7 of said separating wall 3 should be arranged in contact with or nearly in contact with the upper surface 4 of the object, regardless of whether this surface, as such, represents the base level of the object or constitutes the bottom level of a marking. Being arranged in this manner, the device is also capable of reading through e.g. thin plastics, a lacquer layer or the like. It is also indifferent what material the actual object to be read is made of, provided that said material has at least one plane level the elevation of which is so clearly definable that said edge of said separating wall can be considered to be arranged in its close vicinity in such a way that the received radiation is weakened to an extent which can be measured, and one other plane level fulfills the criteria regarding such a radiation reflectivity that a correspondingly distinguishable stronger radiation signal can be received.

Figure 6A:
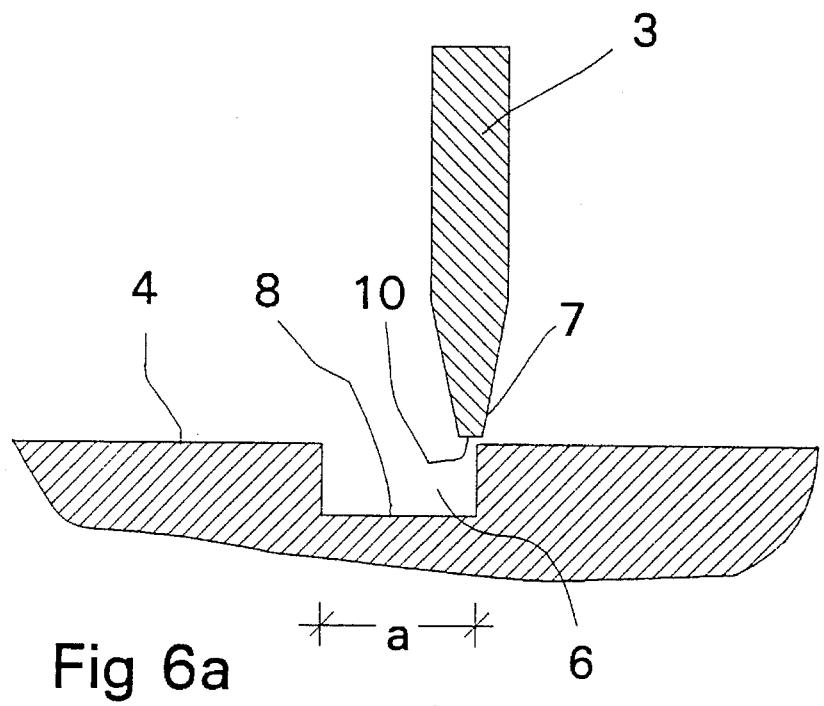
FIGS. 6a and 6b show, on an enlarged scale, how the edge of the separating wall moves at different plane levels arranged at the surface of the object, and FIGS. 7a ... 7c schematically show how a bar code to be read can be arranged at an arbitrary angle with respect to the edge of a separating wall, said angle primarily being defined in accordance with the general structural principle of a bar code reader, which is known per se.
Figure 6B:
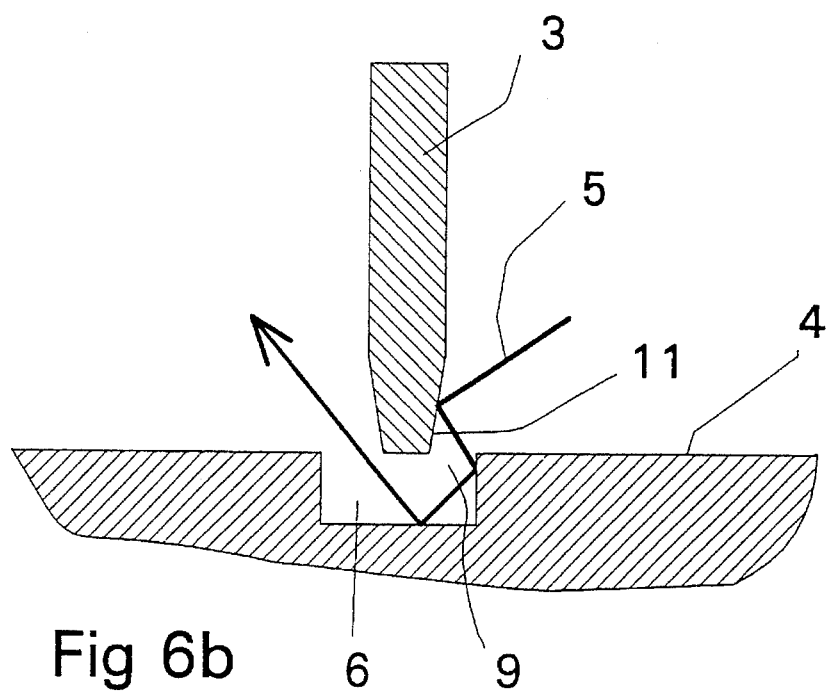

As such, the reading accuracy is determined according to the thickness and partly according to the reflectivity of said edge of said separating wall 3. Said edge 7 will primarily function as a shield, but if the thickness of said edge 7 is greater than the narrowest imprint to be read, said wall 3 will completely cover said imprint at some portion thereof, in which case the beam from said transmitter cannot pass through to the receiver. Thus, said separating wall 3 is favorably constituted of a knife-like means which suitably is essentially sharp at its edge, preferably so that the thickness of said wall or the width of its cross section at the outermost edge 7 which is to be arranged against said surface 4 is not more than half, suitably not more than one fourth of the width of the narrowest imprint marking of the bar code, which in FIG. 6a is indicated with the reference "a". In the embodiment disclosed in FIGS. 6a and 6b the actual separating wall 3 is a thicker structure which is thinned at its edge 7.

In order to prevent, as efficiently as possible, the passing of diffused radiation between said edge 7 and the surface 4 of the object, the undermost surface portion 10 of said edge 7 may be coated with a coating which suppresses reflectivity. Correspondingly, that corner portion at said edge 7, which is directed towards said transmitter, is favorably equipped with a mirror surface 11 or the like, in which case also a diffuse radiation 5 hitting said corner portion will be directed the bottom of the imprint from where it will be reflected to the receiver along the "channel" or slit 9 seen in FIG. 6b when the edge wall 3 is not located at the position of a plane level portion 4 extending higher up.

Thus, since the separating wall 3 is a simple narrow vertical means, said transmitter 1 and said receiver 2 can be realized in an nearly arbitrary manner. Thus, such arrangements can widely be avoided, which are complicated and demand accuracy with respect to the orientation, like optical fibers or lens arrangements, or such means can be used, when desired, where the use thereof is appropriate for other reasons. Thus, the invention presents a favorable and, with respect to known technology, considerably simpler solution for the reading of imprinted markings, such as such bar codes which are pressed deep into a surface.

The invention has been presented above primarily referring to means based on light, but in this respect it should be observed that the word "light" within the scope of the invention widely covers also other possible radiation, an thus also infrared and ultraviolet radiation is considered to be light. The invention can further be adapted in connection with other radiation so widely that even the use of ultrasound in some cases might be applicable within the invention's definition of light. Within the scope of the invention the only restricting factor should be that the radiation used must reflect from at least some portions of the surface of the object and that said separating wall in certain defined situations is capable of preventing said radiation from reaching the receiver.

I claim:

1. A method for detecting imprinted markings (6, 6a) made into an object, especially a bar code comprising, said markings (6, 6a) being formed to at least one second level (8) which differs from a first level (4) representing the base surface level of said object, wherein the surface of at least that level (4 or 8) which is lower, is arranged to provide reflection of a radiation (5) at least to some extent, said method utilizing radiation transmitting (1) and, correspondingly, receiving (2) means located apart from said transmitting means, characterized in that said radiation transmitting (1) and receiving (2) means are separated from each other by a separating wall (3) which is arranged essentially transversely with respect to the surface of said object and having an edge (7) extending from the surface level of said transmitting and/or receiving means (1, 2) in close relationship with the surface (4) of said object, said separating wall (3) preventing the passage of said radiation (5) from said transmitting means (1) to said receiving means (2) at such locations of said object, where the surface (4) which is positioned at a higher level will extend essentially to said edge (7) of said separating wall (3).

2. A method according to claim 1, characterized in that said receiving means (2) are connected to filtering and/or processing means which define an outgoing signal only based on such signals from said receiving means which correspond to the signal level at such locations where said radiation (5) passes through an essential slit (9) between said edge (7) of said separating wall (3) and a depressed lower level (8) which is located lower farther away from said transmitting and/or receiving means (1, 2).

3. The use of a method according to claim 1 for reading such a permanent bar code which is formed by pressing imprints (6, 6a) or embossments, respectively, into the surface (4) of an object.

4. A reader head device for reading imprint markings (6) made into the surface of an object, especially for reading a bar code, said device comprising means (1) for transmitting radiation (5) to be reflected via a surface (4) of said object to receiving means (2), wherein said transmitting and receiving means (1 and 2, respectively) are separated from each other by means located there between, characterized in that said means located between said transmitting (1) and said receiving (2) means comprise a separating wall (3) which is arranged in a plane which is essentially transversal to said surface (4) of said object, an edge (7) of said wall extending beyond said transmitting and/or receiving means (1, 2) essentially to that surface (4) of said object, which is higher up.

5. A device according to claim 4, characterized in said transmitting and/or receiving means (1 and 2, respectively) being arranged at a distance from the level of said object and directed suitably at least to some extent at an inclined angle so that the radiation (5) sent by said transmitting means (1) is reflected via said object to corresponding receiving means (2) located apart from said transmitting means (1).

6. A device according to claim 4, characterized in that said separating wall (3) comprises a knife-like member, the lowermost portion (10) of said edge (7) of said separating wall (3) suitably comprising a coating which reduces reflection.

7. A device according to claim 3, characterized in said separating wall (3) being essentially sharp at its edge, preferably so that the thickness of said wall at the peak edge (7), which will be positioned against said surface (4), is not more than equal to a half, suitably to one fourth of the width of the narrowest imprint marking (6a) of a bar code.

8. A device according to claim 4, characterized in said reading head being constituted of several transmitters (1) and/or receivers (2) arranged in parallel, and, correspondingly, one common separating wall (3), or several walls with one wall arranged for each of the transmitters/receivers.

9. A device according to claim 4, characterized in each separating wall (3) being a tubular member surrounding said transmitter (1) and/or said receiver (2).

10. A device according to claim 4, characterized in said separating wall (3) comprising a mirror surface (11) at said edge (7) of said separating wall (3), at least at one of its sides, preferably at the side, which is positioned towards said transmitter (1).

11. The use of a device according to claim 4 for reading such a permanent bar code which is formed by pressing imprints (6, 6a) or embossments, respectively, into the surface (4) of an object.

* * * * *